(12) United States Patent
Massie et al.

(10) Patent No.: US 7,808,528 B2
(45) Date of Patent: Oct. 5, 2010

(54) METHOD AND APPARATUS FOR AN ON-CHIP VARIABLE ACUITY IMAGER ARRAY INCORPORATING ROLL, PITCH AND YAW ANGLE RATES MEASUREMENT

(75) Inventors: Mark Alan Massie, Santa Ynez, CA (US); Jon Paul Curzan, Arroyo Grande, CA (US); Christopher Robert Baxter, Santa Barbara, CA (US); Ralph Roch Etienne-Cummings, Washington, DC (US)

(73) Assignee: Nova Research, Inc., Solvang, CA (US)

( * ) Notice: Subject to any disclaimer, the term of this patent is extended or adjusted under 35 U.S.C. 154(b) by 120 days.

(21) Appl. No.: 12/177,048

(22) Filed: Jul. 21, 2008

(65) Prior Publication Data

US 2009/0051796 A1    Feb. 26, 2009

Related U.S. Application Data

(63) Continuation of application No. 10/613,126, filed on Jul. 3, 2003, now Pat. No. 7,408,572.

(51) Int. Cl.
*H04N 5/228* (2006.01)

(52) U.S. Cl. .................................. 348/208.14

(58) Field of Classification Search ............ 348/208.14, 348/169–172
See application file for complete search history.

(56) References Cited

U.S. PATENT DOCUMENTS

| | | | | |
|---|---|---|---|---|
| 4,554,585 A * | 11/1985 | Carlson | .................. | 348/342 |
| 5,243,418 A * | 9/1993 | Kuno et al. | .................. | 348/155 |
| 5,390,133 A * | 2/1995 | Sohie | .................. | 342/159 |
| 5,796,095 A * | 8/1998 | Matsuyama et al. | ...... | 250/208.1 |
| 6,455,831 B1 * | 9/2002 | Bandera et al. | .......... | 250/208.1 |
| 6,839,452 B1 * | 1/2005 | Yang et al. | .................. | 382/103 |
| 6,957,493 B2 * | 10/2005 | Kumagai et al. | .............. | 33/290 |
| 7,009,645 B1 * | 3/2006 | Sandini et al. | .............. | 348/275 |
| 2002/0076087 A1 * | 6/2002 | You et al. | .................. | 382/103 |
| 2002/0180877 A1 * | 12/2002 | Kikuchi | .................. | 348/315 |

* cited by examiner

*Primary Examiner*—James M Hannett
(74) *Attorney, Agent, or Firm*—Felix L. Fischer (57) ABSTRACT

A variable acuity imager incorporates an array of detection elements for light energy, in the visible, infrared, ultraviolet, or light energy in another region of the electromagnetic spectrum with a means to change the spatial configuration of the array to include "superpixels" by combining energy detected by adjacent elements, thus permitting any number of high-resolution "foveal" regions to be placed within the confines of the focal plane array and moved around at the frame rate of the imaging device. Detectors to measure the pitch, yaw and roll angle rates of background imagery using velocity-sensing circuitry are employed for variation of the foveal regions to accommodate motion of the array.

11 Claims, 13 Drawing Sheets

METHOD AND APPARATUS FOR AN ON-CHIP VARIABLE ACUITY IMAGER ARRAY INCORPORATING ROLL, PITCH AND YAW ANGLE RATES MEASUREMENT

CROSS-REFERENCE TO RELATED APPLICATIONS

This application claims priority of the Provisional Application Ser. No. 60/394,031, filed on Jul. 6, 2002, having a title of "VARIABLE ACUITY IMAGER WITH ON-CHIP ROLL/PITCH/YAW ANGLE RATE SENSING" and is a continuation application of co-pending application Ser. No. 10/613,126 filed on Jul. 3, 2003 having the same title as the present application, the disclosures of which are both incorporated herein by reference.

STATEMENT REGARDING FEDERALLY SPONSORED RESEARCH

This invention was conceived and/or reduced to practice in conjunction with Air Force Research Laboratory, Eglin AFB contract no. F08630-00-C-0018.

BACKGROUND OF THE INVENTION

1. Field of the Invention

This invention relates generally to the field of focal plane imaging devices and, more particularly, to an imaging system employing variable acuity super-pixel imaging that also provides analog signals representative of pitch, roll and yaw angle rates by image motion analysis.

2. Description of the Related Art

Sensing high spatial resolution imagery at very high frame rates, covering wide fields of view while at the same time producing a low data bandwidth so as not to overload data transmission "pipes" is problematic in current imaging systems. As an example, in current "megapixel" imaging systems; high frame rates (e.g., higher than 1000 frames per second) would produce pixel rates in excess of one billion pixels per second; high dynamic range representations of pixels (e.g., 16 bits per pixel, or two bytes per pixel) would produce in excess of two billion bytes per second, or 32 billion bits per second.

Prior imaging systems have been disclosed in U.S. Pat. No. 5,949,483 to Fossum entitled "Active pixel sensor array with multiresolution readout", U.S. Pat. No. 5,430,294 to Mears entitled "Staring focal plane array architecture for multiple applications" and U.S. Pat. No. 5,541,654 to Roberts entitled "Focal plane array imaging device with random access architecture". Fossum discloses use of variable acuity in imaging systems but limits the number of acuity regions and requires that they be of rectangular shape. In addition, spatial agglomeration of pixel values in Fossum's implementation is performed in the column region of the integrated circuit imposing a speed limitation on the number of frames per second which may be produced because all analog pixel values must be shifted out of the unit cell region before such pixel combination is performed. The "windowing" features as represented in Mears' work permits high-speed image sampling, but image regions outside of the desired window are simply ignored.

It is therefore desirable to provide an imager having the capability to permit its pixels be spatially reconfigured and combined, resulting in very high frame rates. It is also desirable to provide the user the ability to produce virtually any spatial configuration. It is also desirable to collect photocharge in temporal "snapshot" mode, guaranteeing temporal coincidence for every pixel in the imager. It is further desirable to permit such updates to take effect without dropping any frames of image data and to produce high-speed, high-relevance imagery, as well as to digitally report its instantaneous spatial configuration. It is also further desirable to provide the ability to mate a variety of detector array types, for applicability to a wide spectral range of useful imaging wavelengths. Also desirable is the ability to measure the roll, pitch and yaw angle rates of background imagery using on-chip circuitry. Finally, it is desirable to perform all desired functions in an integrated circuit that consumes extremely low power and has an extremely low mass.

SUMMARY OF THE INVENTION

The imager of the present invention consists of two subsystems, the "Variable Acuity Superpixel Imager" (VASI) subsystem and the "Yaw Pitch Roll" (YPR) subsystem. The VASI subsystem provides a means for very high-speed two-dimensional imaging of the complete field-of-view with the capability of retaining the highest possible spatial resolution on regions of interest that are important to the overall system. The YPR subsystem measures the visual motion of far-field features in the environment, such as the horizon, to determine the angular ego motion of the vehicle. These combined functions mimic important visual functions in biological sensory systems.

The embodiment disclosed herein has a VASI subsystem with a plurality of image elements or "standard pixels" arranged in an X by Y array, each of the elements including a detector and a sample and hold capacitor. A switching element for connecting the sample and hold capacitor of each element to the sample and hold capacitor of a left adjacent element responsive to a first control signal and connecting the sample and hold capacitor of each element to the sample and hold capacitor of an upper adjacent element responsive to a second control signal is employed to create superpixels in selected regions. A processor selectively generates the first control signal for each element in a dynamically defined super-pixel and selectively generates the second control signal for each element in the dynamically defined super-pixel. The processor incorporates an analysis engine for dynamically defining at least one superpixel. Output circuitry is provided for reading the sample and hold capacitor of each element not receiving a control signal and for reading the sample and hold capacitor of a master element in each super-pixel, the master element being the leftmost and uppermost element in the super pixel.

The YPR subsystem consists of numerous dedicated yaw, pitch and roll regions of pixel-based optical sensing arrays circumferentially spaced around the X by Y imaging array, each motion sensing array has a plurality of elements substantially tangentially oriented to the X by Y array. An edge detector is associated with each element and connected to adjacent edge detectors for elements of the motion sensing array. Circuitry for synchronizing a signal or edge received by the detectors interconnects each edge detector, and transmission of the relative signal between detectors is employed for computing velocity. The velocity is spatially integrated to provide a velocity vector and the velocity vector is employed to modify the foveal location in the X by Y array.

BRIEF DESCRIPTION OF THE DRAWINGS

These and other features and advantages of the present invention will be better understood by reference to the following detailed description when considered in connection with the accompanying drawings wherein.

DETAILED DESCRIPTION OF THE INVENTION

The present invention provides an imaging system solving the problem of transmitting on the "most important" aspects of the image while retaining the essential information contained in the rest of the image. "Variable Acuity Superpixel Imaging" (VASI) technology, the subject of this invention, provides selected imaging and motion-analysis functions comparable to the human retina to be able to report analog signals representative of regions within the image requiring high spatial resolution sampling as well as image-based pitch, yaw and roll angle rates.

A system employing the present invention permits complete freedom with respect to the spatial agglomeration of pixels on the imaging device without limitation to number and size of image regions which may be so configured. Further, performance of such spatial agglomeration processing within each unit cell in a massively parallel fashion combined with intelligent means for fast spatial configuration is desirable such that the resulting frame rate is as fast as possible. Such a feature permits visible and infrared realizations of the invention to sample image data at audio rates.

A VASI device employing the present invention retains the information in the entire field-of-view by agglomerating such peripheral pixels into larger superpixels; image information in these peripheral regions is retained, albeit at lower spatial resolution. This is very comparable to the means by which the retinal structures in vertebrate animals permit high spatial sampling in central "foveal" regions, with lesser importance attached to imagery in peripheral regions. Peripheral regions are nonetheless sampled in case the animal must quickly divert its motion so as to evade potential prey, or to respond to visual cues that would otherwise be missed by the windowing approach. In addition, a novel divergence of the present VASI technology is that which combines "biologically inspired" angle-rate sensing pixels with the high-speed VASI system. The combined "system on a chip" has produced an imaging system which also has the capability to provide important guidance and navigation signals useful for flight control and/or stabilization of the sensor platform on which it is mounted. No other related technology in the literature has combined such features on to a single integrated circuit.

Figure 1A:
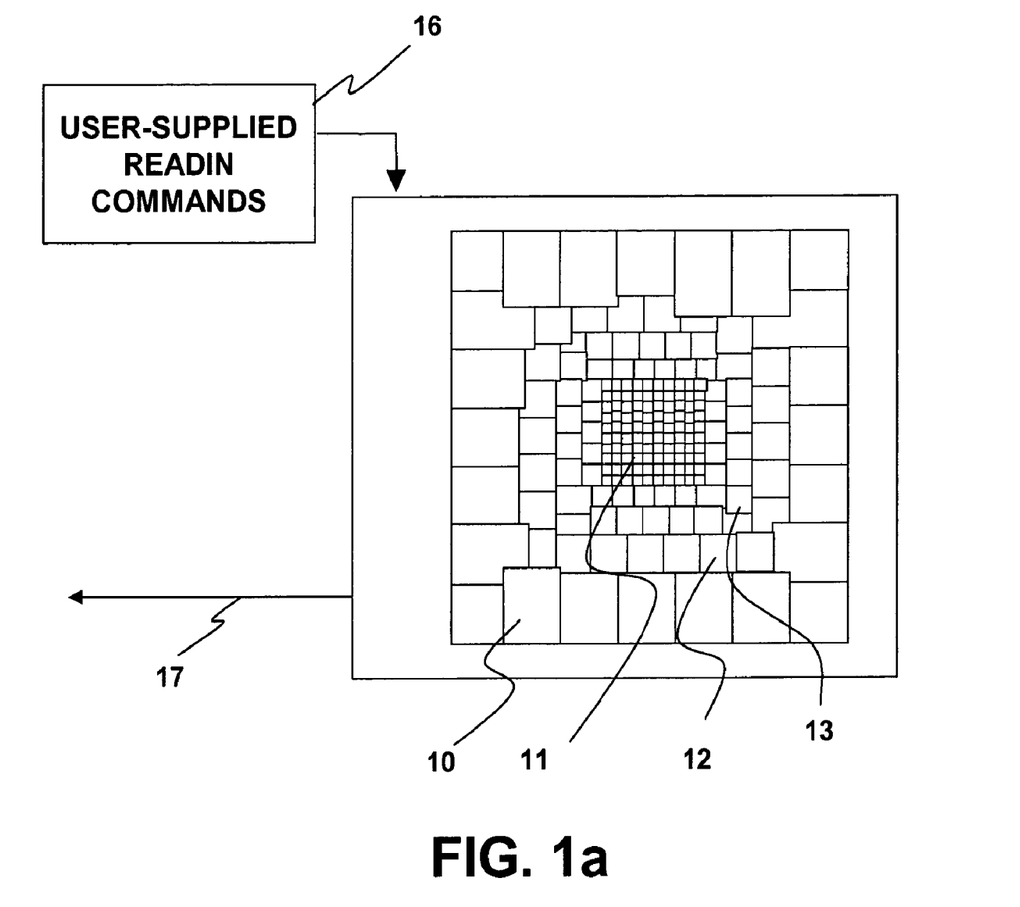
FIG. 1a is an example of two superpixel programming states for the VASI employing the present invention, showing high-resolution pixels in a "foveal" region as well as lower-resolution superpixels that are the result of agglomeration of "standard" pixels.
Figure 1B:
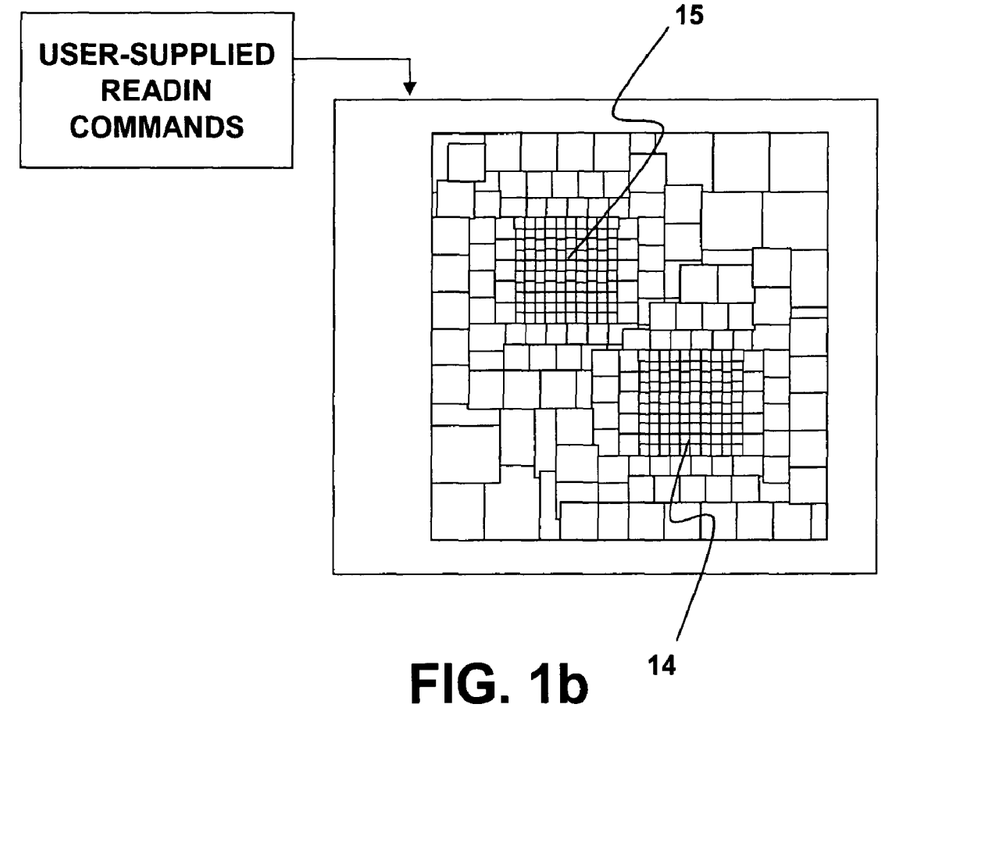
FIG. 1b is a second example of the superpixel programming states for the VASI with two foveal regions having high-resolution.

FIGS. 1a and 1b show two spatial configuration instances of the present invention for comparative purposes. The spatial configuration in FIG. 1a shows a single high-spatial resolution foveal region in the center of the field of view surrounded by superpixels with increasing effective size growing in a radial direction. This condition is much like the spatial configuration of pixels contained in human and other vertebrate animal eyes. Large superpixel 10 resides in regions of the field of view that are contained in background peripheral regions which contain imagery that is not as significant as image components which are sampled by high-spatial resolution foveal pixels 11. The superpixels are definable for various resolution resulting in alternative sizing as representatively demonstrated by superpixels 12 and 13. The spatial configuration in FIG. 1b shows, for example, two high-spatial resolution foveal regions 14 and 15 that may be dynamically changed as scene contents change with time based on the VASI control system 16. User- or processor-supplied commands are provided to the chip to produce specific spatial configuration states, and only a single value is multiplexed off-chip on output bus 17 for each superpixel. In the high-spatial resolution regions, individual "standard" pixels are considered superpixels with a dimensionality of "1×1". In larger superpixel regions, dimensionality of "m×n" results in a reduction of output data bandwidth because each m×n superpixel still multiplexes out only a single value per frame. This feature leads to a dramatic increase in the effective frame rate of the system, without compromising on the spatial resolution of intended targets, while still maintaining a sampling over the entire field of view (in contrast to more conventional "windowing" architectures). In addition, the spatial configuration of the device may be changed at the frame rate without dropping intermediate frames. This is an important feature for high-speed applications where data loss would be detrimental.

Figure 2:
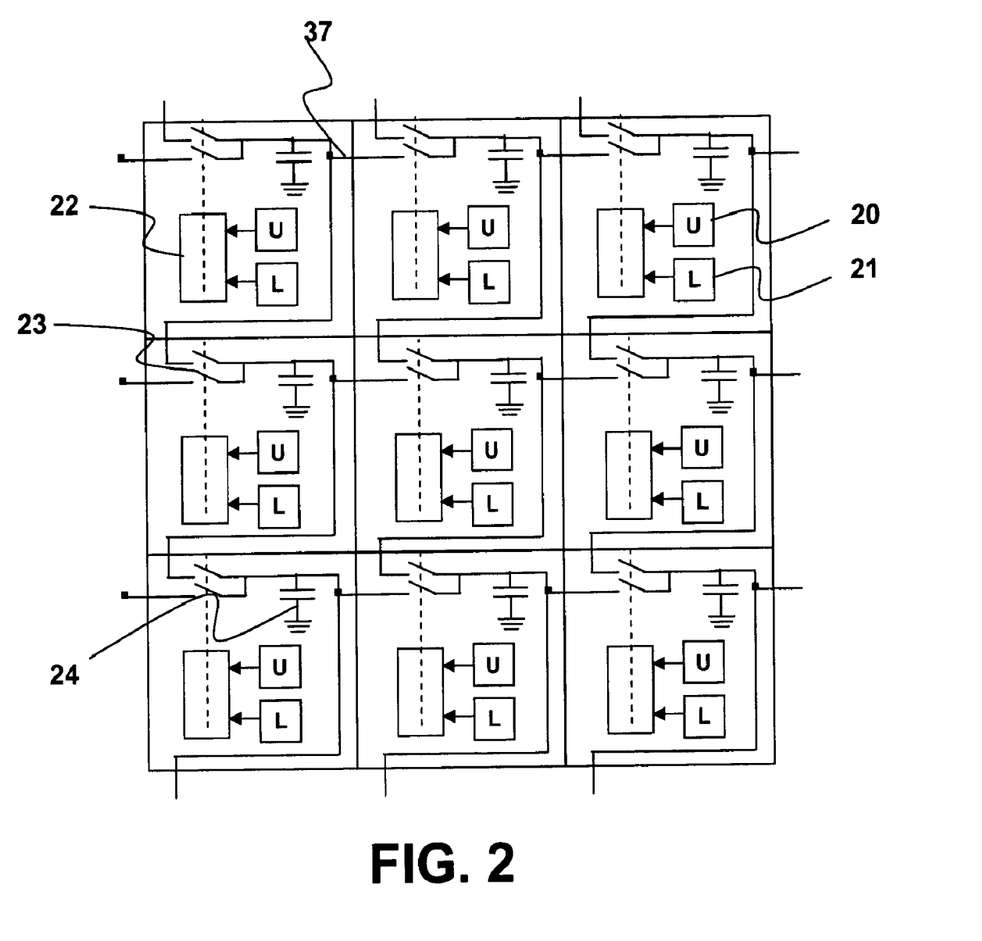
FIG. 2 is a schematic diagram showing each "standard" unit cell containing two bits of static ram (designated by "U" and "L" bits) and switch controls for superpixel formation.

The spatial configuration of the VASI is accomplished through the use of two bits of static randomly-addressable memory (SRAM) which reside in each unit cell structure, as represented in FIG. 2. The "U" bit 20 controls the operation of an in-cell FET-based "switch" 23 connection to the "upper" unit cell that effectively connects the charge integration capacitors 24 of the two respective unit cells together. Similarly, the "L" bit 21 controls its respective switch that permits photo-induced charge sharing to be accomplished between the unit cell and its "left" neighboring unit cell. Control logic 22 residing in each unit cell permits the usage of said U and L bits to accomplish their respective switch closures resulting in respective charge sharing operations.

Figure 3:
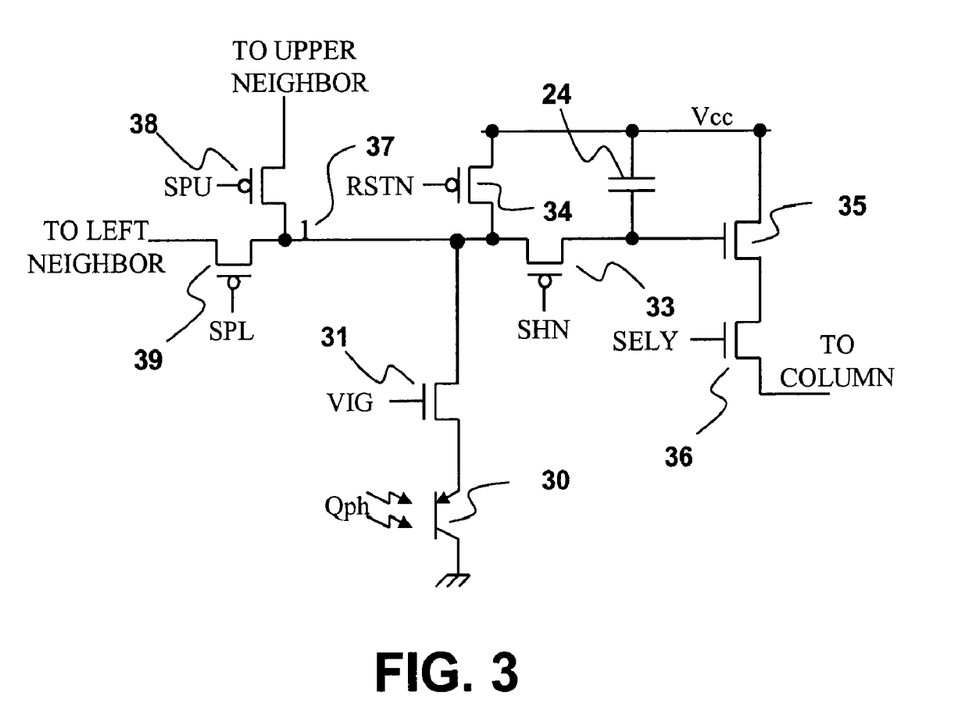
FIG. 3 is a circuit diagram showing the unit cell circuitry required to implement neighbor charge sharing for spatial configuration of the imager.

Unit cell structures required to collect photocharge, spatially distribute this photocharge with neighbors and "read out" the resulting signal from the unit cell are detailed in FIG. 3. A photo-induced signal charge producer is provided either in the form of an in-cell visible phototransistor (or photodiode) or an external photodiode junction present on an array of photodiodes which is indium-bump hybridized to each unit cell in the array. FIG. 3 indicates a phototransistor 30 that produces photocharge to flow in response to illumination. The case shown uses a p-type phototransistor that permits charges to flow from the higher-voltage side (emitter) through its channel to its grounded collector, thus reducing the voltage on the integration capacitor 24, but a person skilled in the design of such devices knows that the entire voltage structure of the circuit may be inverted, permitting the use of an n-type device that would tend to charge up the integration capacitor. Sample-and-hold FET 33 is controlled with appropriate application of signal SHN to isolate charges on the integration capacitor, whose voltage is represented through the conductance of an in-cell source follower 35. The source follower's signal is subsequently conducted out of the unit cell through the use of column select FET 36 through appropriate control of the SELY signal. Subsequent sampling cycles will use sample-and-hole reset FET 34 with appropriate signal application of RSTN and SHN to discharge integration capacitor 32 to begin a new photocharge integration cycle.

During an appropriate period during the charge integration and signal processing cycle, neighbor connection FETs 38 and 39 will be controlled through application of signals SPL and SPU, respectively, to share the integration capacitor's charge, directed by the state of the "U" and "L" bits as described in FIG. 2. Implementation of these two bits of in-cell static RAM memory is described in FIG. 4, in which two inverters are used to latch a particular value (either a HI or a LO signal state) on SRAM output node 40. As shown, SPU and SPL are the "superpixel up" and "superpixel left" bit values, respectively. Signal SELY is also used to control the interrogation of these bits of information to respective column sense logic circuits for testing or other processing purposes.

Figure 4:
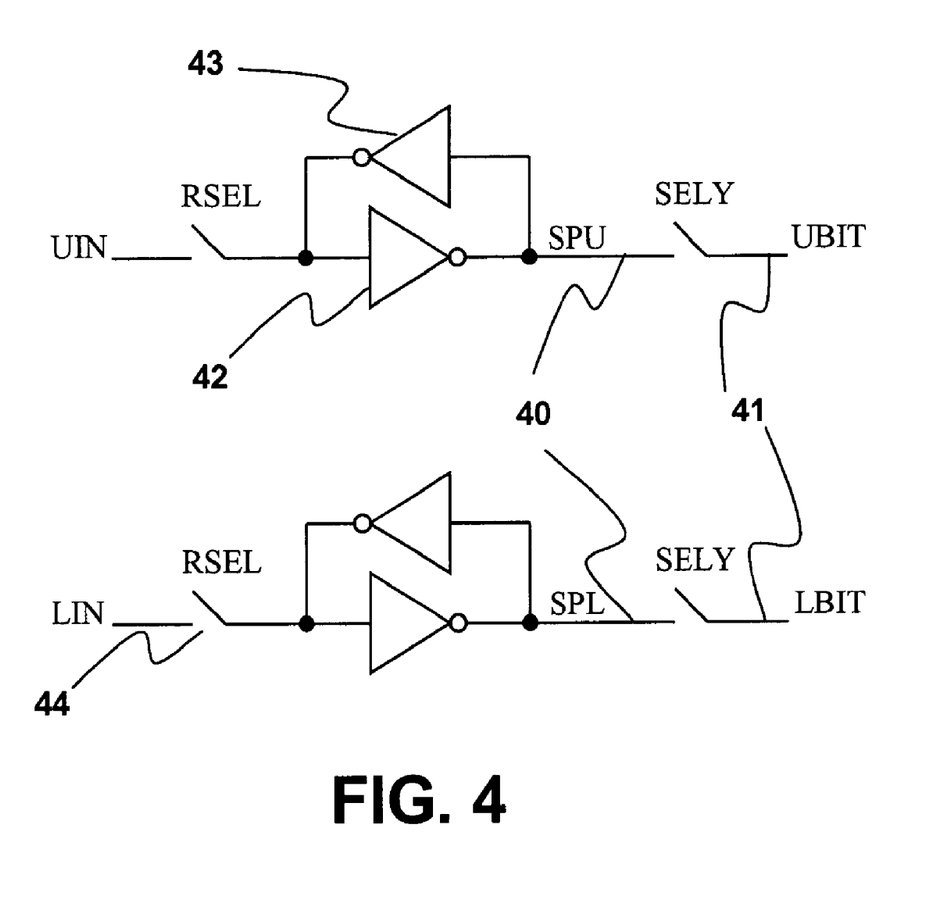
FIG. 4 is a circuit diagram showing how the two bits of unit cell static RAM (SRAM) are configured by using two feedback-coupled inverter stages.

Forward inverter transistors as represented by device 42 have width-to-length ratios >1 to increase their output drive onto the bit column. Latching inverter transistors 43 have width-to-length ratios <1 to allow the UIN or LIN signal to toggle the input node, permitting the input to the forward inverters to change, thus producing a change in their latched outputs SPU and SPL, respectively. The operation of these circuits have been verified with actual test hardware, and is similar to those circuits commonly used by persons skilled in the art for the creation of latches and flip-flop logic elements.

The signal RSEL is driven by a logic voltage which may go above the specified positive power supply voltage of the circuit for the purpose of minimizing the threshold drop across the drain-source of FET 44.

Figure 5:
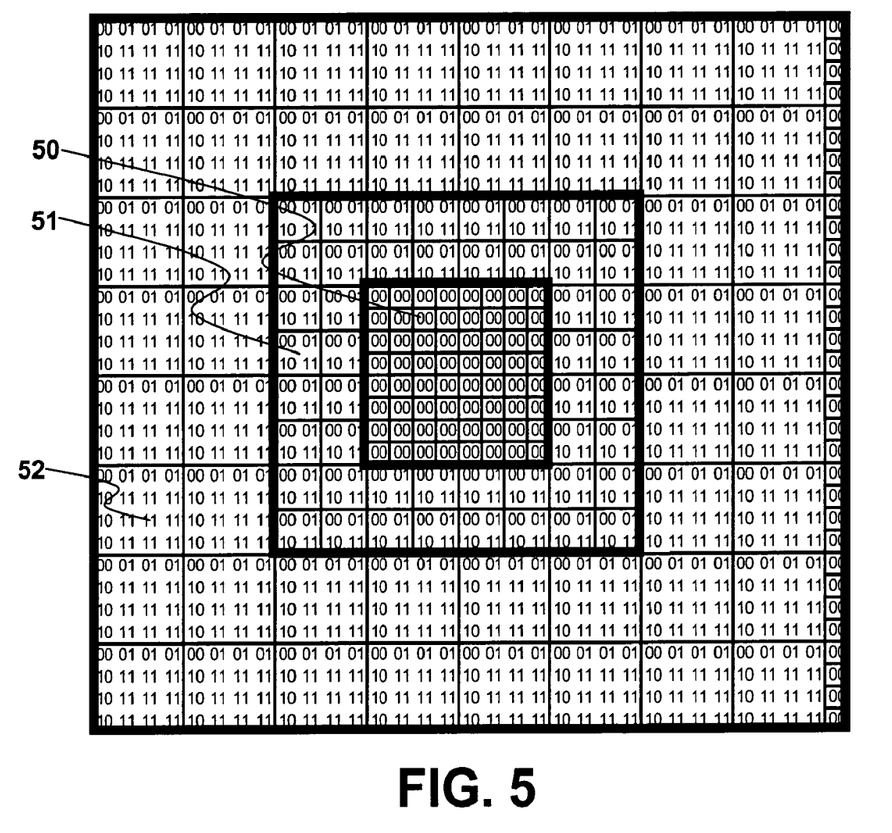
FIG. 5 shows an example SRAM bit configuration file for a 32×32 pixel "central fovea" implementation of the VASI in which each pair of numeric values indicates the "UL" bit pair programmed into respective unit cell SRAM.

FIG. 5 demonstrates an application whereby the two respective in-cell SRAM bits have been programmed into respective individual unit cells to produce a spatial configuration representative of a central "foveal" region 50 surrounded by a "ring" of lower resolution superpixels 51 followed once again by an even lower spatial resolution background region 52. The bit pair is in the (U, L) order as indicated in this figure. The foveal region indicated as 50 is shown to have (U, L) bit pairs having values of (0,0); this indicates that these respective pixels will not perform any charge sharing with their neighbors, hence, they retain the highest possible spatial resolution on the image. Pixels in region 51 are shown to be composed of 2×2 regions of standard pixels, the top row for which has "0" in the upper row U bits thus preventing charge sharing with upper neighbors. The lower left corner has a "1" in its U bit, and a "0" in its L bit; of the lower right corner has a "1" in its U bit and L bit for completing the proper charge sharing condition required for this 2×2 configuration. Similarly, the (U, L) bit codes in region 52 are shown which configure these superpixel regions into 4×4 regions of standard pixels, permitting photocharges residing in individual charge integration capacitors to be shared, producing superpixels that are 4×4 in size wherein top left pixel has "0" in both the U bit and L bit while all pixels in the upper row have a "0" in the U bit and a "1" in the L bit for charge sharing with their left neighbor; the left column pixels have a "1" in the U bit and a "0" in the L bit for sharing upward and the remaining bits in the 4×4 superpixel have a "1" in both the U bits and L bits for sharing left and up.

Figure 6A:
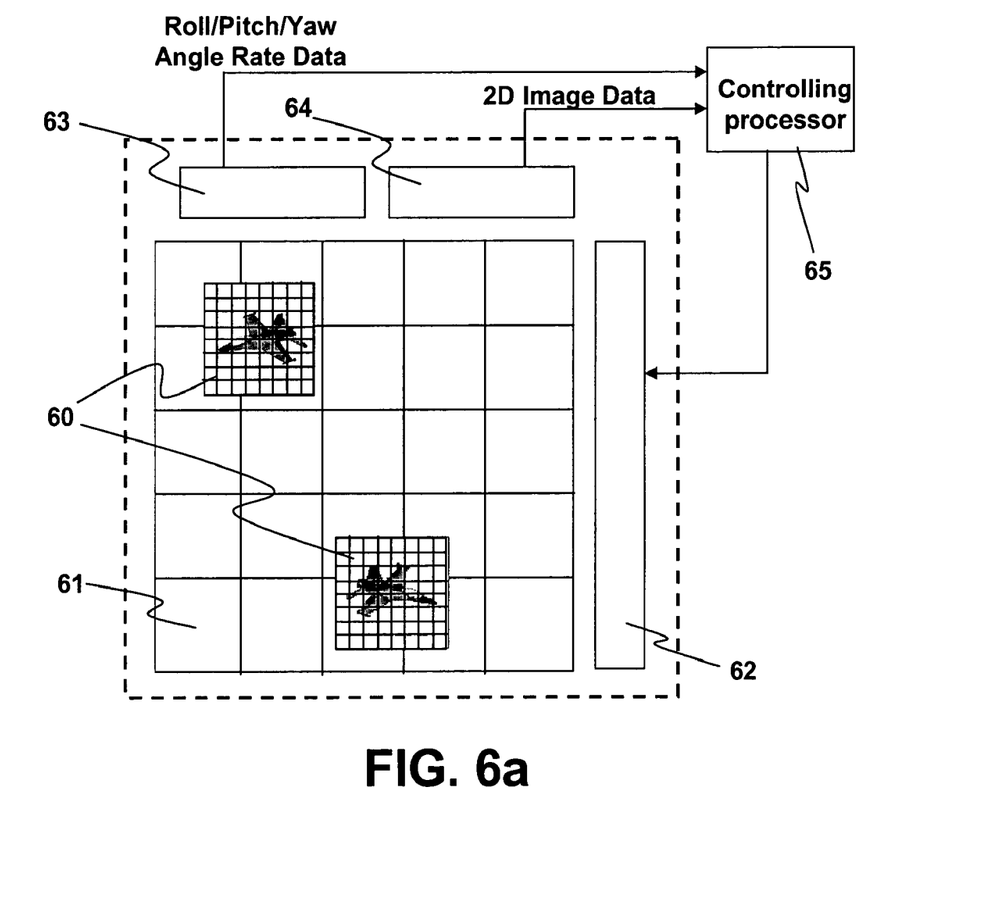
FIG. 6a indicates an example application of the VASI Angle-Rate Sensing Chip in which two aircraft targets are tracked by high-resolution foveal regions while yaw/pitch/roll data is concurrently measured by the on-chip YPR subsystem.

Multiple foveal regions of unique sizes with superpixellated background regions may be configured in this manner as depicted in FIG. 6a. As shown, multiple foveal regions 60 may be placed around the imaging region, each of which sample the scene at high spatial resolution, and the background regions may be sampled by superpixels 61 of larger effective size. While this figure shows background regions composed of a single superpixel shape and size for simplicity, it is to be noted that any number and shape of background superpixels may be configured and applied depending upon direction by a controlling processor 65. The controlling processor produces superpixel programming based on analysis of scene contents, inputs for the roll/pitch/yaw sensors and other sensor inputs. A superpixel programming input decoder 62 is a functional block which accepts superpixel spatial configuration clocking information from the external processor and converts these signals into those appropriate for programming the array of in-cell SRAM as described in FIG. 4. In addition, circuitry surrounding the VASI region denoted by region 64 contains the output driver that conducts the multiplexed analog superpixel voltages and drives representations of these signals off chip to support circuitry. Represented as a single block in this diagram, region 63 contains circuitry required to measure the yaw, pitch and roll of the sensor based on the optical motion of background structures imaged into these regions. These functions are discussed in greater detail subsequently with respect to FIG. 8.

Figure 7:
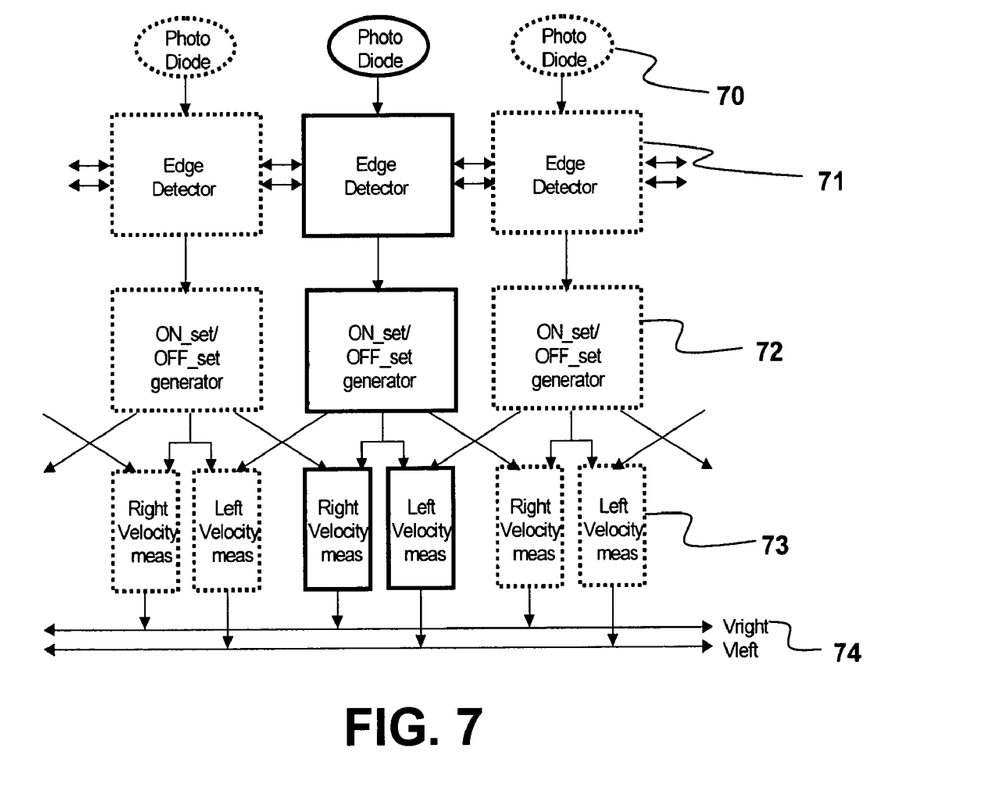
FIG. 7 is a block diagram showing how the on-chip angle rate YPR velocity measurements are performed by cascaded circuit layers which sense the period of time of the motion of focused background imagery from one pixel to another pixel separated by a known distance.
Figure 8:
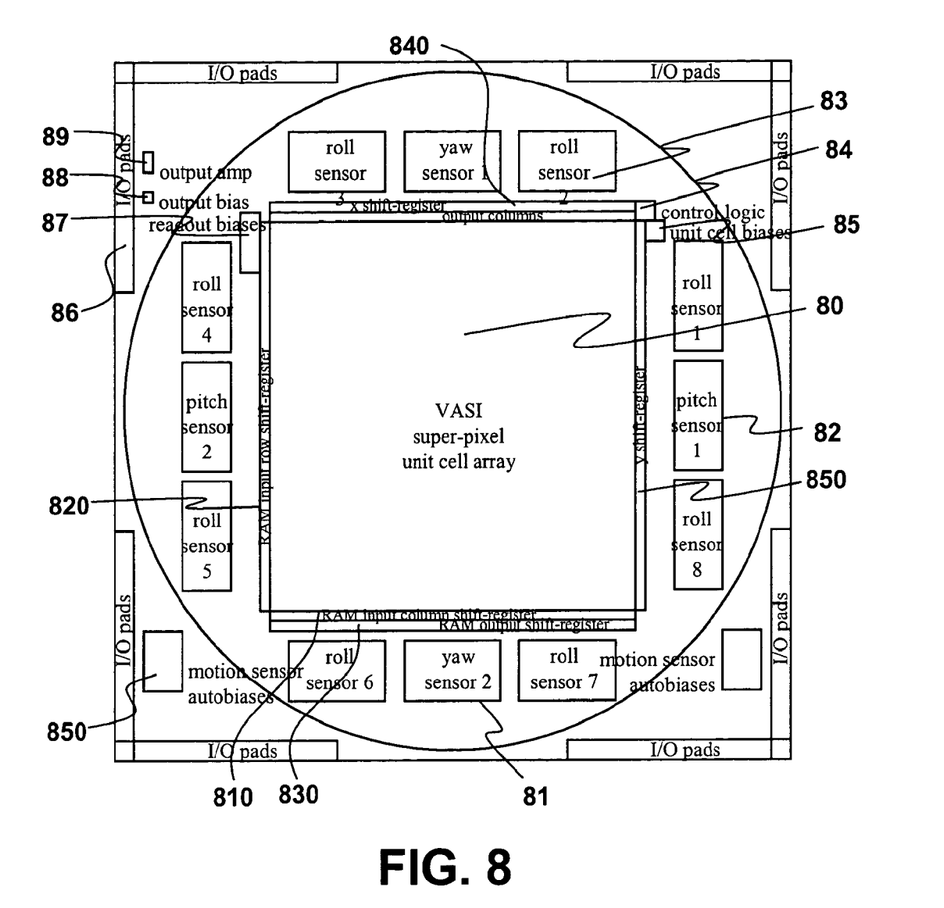
FIG. 8 is a layout plot showing a block diagram representation of 128×128 preferred embodiment of the VASI chip with on-chip yaw/pitch/roll angle rate sensing capability; and, FIGS. 9a-9c show three frames from a representative real-time spatial reconfiguration demonstration of the 128×128 VASI permitting new spatial configurations to be implemented with each frame, enabling real-time foveal tracking operations.

FIG. 7 describes the functional blocks incorporated in the present invention which compute real-time yaw, pitch and roll based on the motion of focused background structures. In the present embodiment, a "pitch sensor", for example, contains 90 individual photodiodes 70 whose signals are processed through three sequential layers of processing. Following transduction of the focused background-induced signal by the photodiode, an edge detector 71 produces a rising edge at the leading and trailing edges of the image component as it passes over the photodiode. Each edge detector has connection to its nearest neighboring edge detector in the present embodiment. Edge detection is an important first stage in this process such that both positive and negative image contrasts both produce the same indication of image presence and motion. The edge information generator 72 is used to measure the period of time transpiring between the appearance of an edge at a given pixel (in this case, the center pixel as shown in FIG. 7) and when this edge appears at a neighboring pixel located a fixed distance away. In essence, when the edge detector 71 produces a pulse indicating the presence of a leading or trailing edge of an image component, the central pixel of FIG. 7 immediately produces the rising edge (i.e., "ON_set" as indicated in the figure) of a voltage ramp signal, the downward slope for which is accurately controlled by an on-chip control bias setting. At the same instant, the central pixel broadcasts a pulse to neighboring pixels (i.e., "OFF_set" as indicated in the figure) which is used by the respective receiving pixels to sample the instantaneous voltage of its own decaying ON_set ramp signal. The difference in voltage between the beginning ON_set ramp voltage and the sampled value (in response to its receipt of the respective OFF_set signal) is representative of the speed of the moving edge. This difference is computed in the velocity measurement layer 73. Two parallel channels of such circuitry is contained in each pixel's block 72 such that "Right" and "Left" velocity measurements are made. The resulting analog velocity signals are driven onto "Vright" and "Vleft" signal busses 74, resulting in an aggregated measure of scene velocity, signals for which are contributed by each of the 90 individual photodiode channels in the respective pitch sensor. Duplicates of this layered velocity sensing system are incorporated into the various yaw, pitch and roll sensors as shown in FIG. 8. Pitch sensors 82 are located in horizontal locations on the chip (at clock positions of 9 and 3 o'clock), yaw sensors 83 are located in vertical locations on the chip (at clock positions of 12 and 6 o'clock), and roll sensors 81 are located at intermediate angular locations. The resulting velocity measurements are purely analog signals and are produced without any requirement for digital clocking, synchronism or phase correlation, much as is the case for biological sensors in the visual sensory system of animals. Knowledge of the YPR motion characteristics of the background infer the inverse motions of the sensor platform since the background is typically fixed with respect to the Earth.

A system implementation of the present invention takes advantage of the yaw, pitch and roll information sensed by the YPR portions of the device to control the resulting location of one or more fovea in the VASI portion of the imaging section of the chip. Since the YPR data exists in an analog form, these three channels of analog information are digitized off-chip by the processor 65 as indicated in FIG. 6a. The processor employs an image-stabilization application to use the digitized YPR data and computes a new foveal position in response to the detected background motion to stabilize the image data within the fovea.

Figure 6B:
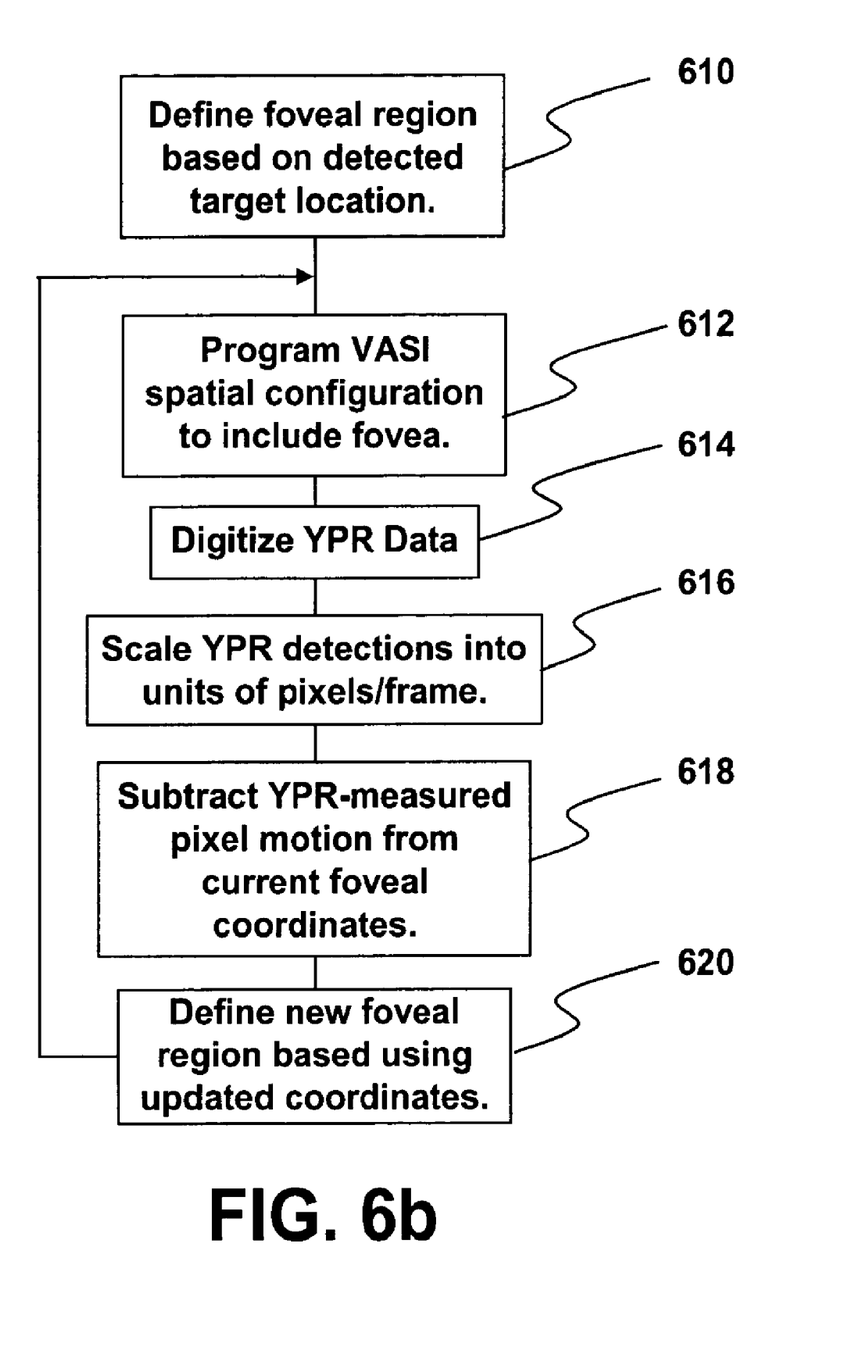
FIG. 6b describes the operational flow implemented to make use of YPR data to re-configure the spatial configuration of the VASI device.

The flow chart of FIG. 6b indicates the general steps required in this process: (a) Define a foveal region based on the location of a detected target related to the target's intensity, shape, or other predetermined detectable physical attribute of the target in block 610, (b) Program the spatial configuration of the on-chip VASI such that a foveal region overlays the detected target in block 612, (c) Digitize the YPR data, providing the yaw, pitch and roll representations of the focused background imagery to the controlling processor for calculation to remove the unwanted sensor platform-induced background motion from the detected target motion in block 614, (d) Scale the YPR detections into units of pixels/frame such that the foveal region in the next frame is offset by the requisite number of pixels to cancel the measured background motion in block 616, (e) Subtract the YPR-measured pixel motion from the current foveal coordinates to reduce the background motion components that would have otherwise been incorporated into the foveal representation of the target to single-pixel error levels in block 618, and (f) Define the new foveal region location based on the updated coordinates in block 620. This new VASI spatial configuration is applied to the next frame of collected image data by reprogramming the VASI's (U, L) bit configuration by repeating this process starting with step (b) above.

Notice that other systems-level applications may be implemented including those related to (a) target tracking based on brightness, motion or size, (b) target identification based on target size, shape or markings or (c) high-speed combustion dynamics and analysis. The above example involved an image stabilization application but workers skilled in the art will recognize that other applications would be possible by using the knowledge of YPR data to be able to reconfigure the spatial nature of the VASI.

Other functional blocks represented in FIG. 8 show that the central VASI array 80 is surrounded by respective yaw 81, pitch 82 and roll 83 (YPR) motion-sensing arrays. Location of control logic 84, unit cell bias generation 85 and input/output (I/O) pads 86 are indicated in the figure as well. Control logic 84 is incorporated onto the chip to perform a variety of functions including multiplexer control, VASI SRAM bit transfer control, YPR sensor timing control and X- and Y-shift register control. The voltage forms required to operate the unit cells in the VASI portion of the chip are generated in the unit cell bias 85 portion including the voltages named "Vcc" and "VIG" as indicated in FIG. 3. The present embodiment makes use of eight regions spaced around the periphery of the chip that incorporate input/output (I/O) wirebonding pads 86; these pads incorporate electrostatic discharge diode protections where required and permit the user to make the required power and signal connections to the chip for proper operation.

Internal readout bias voltages are produced in region 87 and the required bias network to operate the single output drive amplifier 89 are included in region 88. Every imaging integrated circuit must incorporate these general classes of circuits for complete operation.

Two sets of shift registers are incorporated into the present embodiment. For the first set of shift registers which deal with writing to and reading from the in-cell SRAM memory, in order to be able to program the (U, L) bits into in-cell SRAM (as described in FIG. 4), RAM input shift register circuits are contained in regions 810 and 820. In addition, to be able to read the resulting programmed states of in-cell SRAM bits, a RAM output shift register is incorporated in region 830.

A second set of shift registers incorporated onto the chip are for the purpose of reading out the analog values produced by individual "standard" or superpixels in the imaging core region of the VASI sensor portion of the chip. By design, the standard unit cell existing in the upper-left corner of superpixel regions are characterized by having (0, 0) values programmed into its (U, L) SRAM spatial configuration bits. In its default mode, the VASI shift register system only reads out those analog pixel values having (0, 0) programmed into its SRAM bits. This guarantees that a greatly reduced number of readout events occurs for each given superpixel. The X- and Y-output shift registers for this purpose are shown in regions 840 and 850, respectively.

A region of circuitry is incorporated that automatically produces the required set of bias voltages to operate the YPR portion of the present embodiment, called the "motion sensor autobiases", shown as 850. Notice that this circuitry is duplicated on both left and right sides of the chip. Operational flexibility is added to this design by incorporating banks of noise bypass capacitors; one of these capacitor bank types is for the purposes of noise reduction and signal rectification in the YPR motion sensing portion of the design, shown in region 860. Similarly, region 870 shows a similar set of noise bypass capacitances used specifically for the purpose of single-pole filtering of the analog signals produced by the VASI imaging portion of the design. Both of these bypass capacitor circuit regions are duplicated on the left and right sides of the present device so as to be able to apply the resulting single-pole RC filtering to every column of VASI image samples produced by the chip.

Finally, region 880 shows the area in which a small number of test detectors are included so as to have the ability to independently measure and verify the operation of the optical detectors used in the VASI and YPR portions of the device. The present embodiment is built onto a silicon die 7.0 mm in linear dimension, but other future embodiments may have differing numbers of pixels and an overall different size.

The embodiment disclosed herein has a VASI subsystem with "standard" imager pixels of 30×30 microns in size, but this pitch is varied according to sensing requirements in other embodiments. The present embodiment is fabricated using a standard 0.5 micron CMOS process. A variety of CMOS technologies are available to fabricate variations on this initial embodiment. The effective output frame rate of the VASI portion of this embodiment of the imager may be in the range of approximately 300 frames/second if configured in the full 128×128 pixel condition, to well in excess of 19,000 frames/second if a 16×16 pixel fovea is used in conjunction with a single agglomerated background pixel covering the rest of the remaining field of view.

The YPR subsystem consists of numerous dedicated yaw, pitch and roll regions of pixel-based optical sensing. The linear detectors, each containing 90 pixels, are organized to measure the horizontal (Y), vertical (P) and rotational (R) image velocity on an image plane perpendicular to the heading direction of the sensor employing the VASI. Each pixel is composed of photodiodes, edge detection, motion detection and average velocity computation layers. All these layers have been designed for low-power operation. In this embodiment, the linear spacing between the YPR linear pixels is approximately 11 microns. Alternative spacing and other nearest neighbor connectivity schemes are employed in other embodiments of the invention with varying YPR sensitivity requirements.

The YPR portion of the chip can report angle rates in the range of 0.2 to 200 radians/second (corresponding to 11 to 11,000 degrees/second), depending upon chip voltage settings. The dynamic programmability of the device offers a wide variety of potential applications depending upon the specific intended use of the sensor.

Figure 9A:
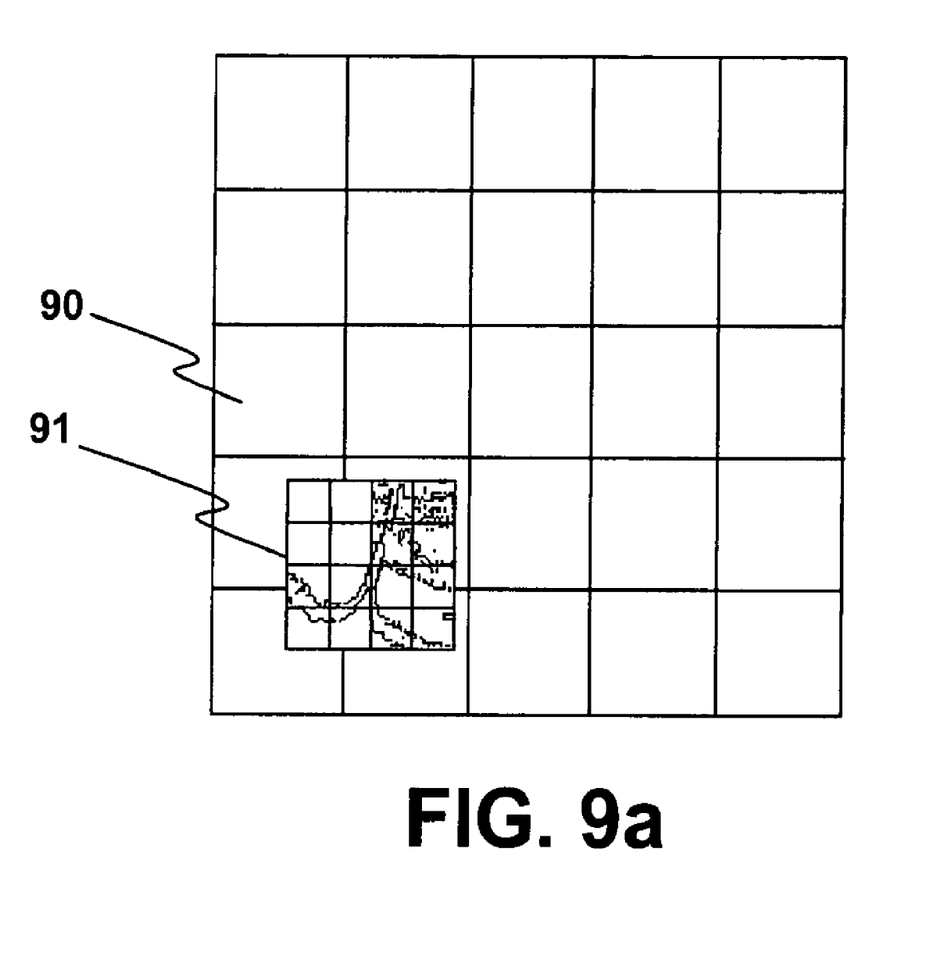
Figure 9B:
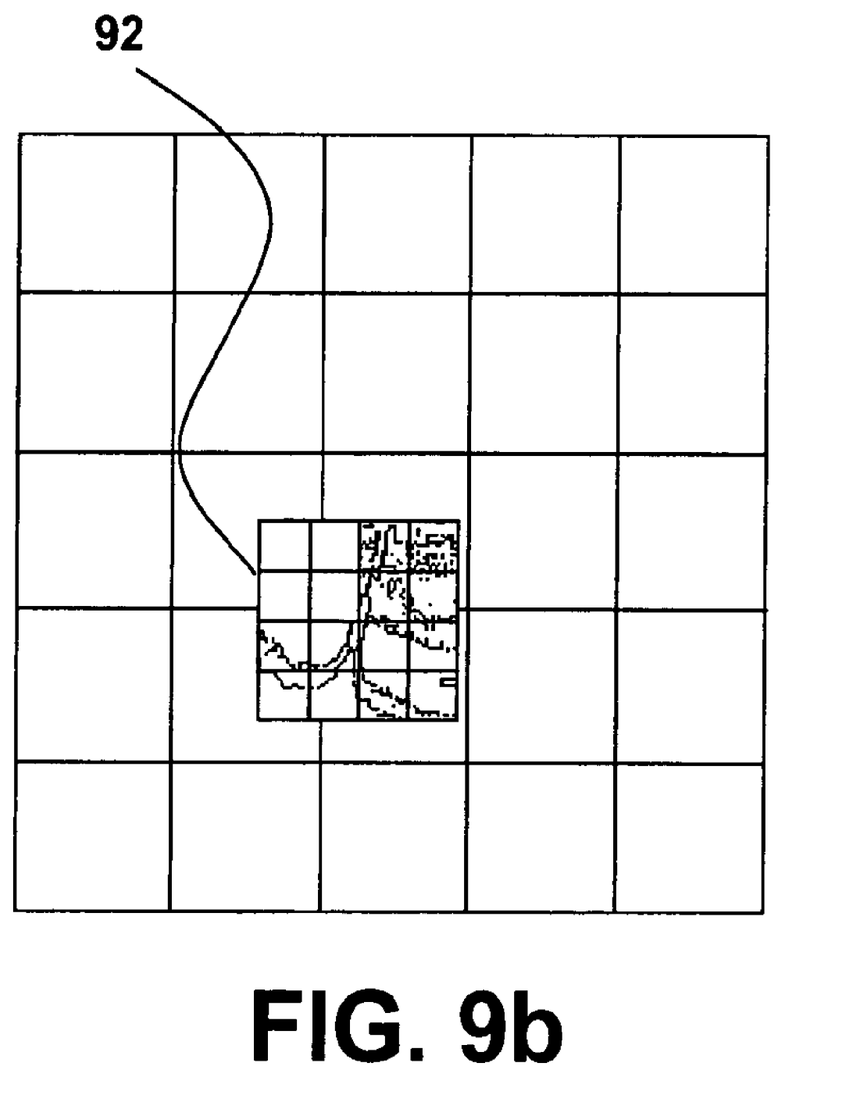
Figure 9C:
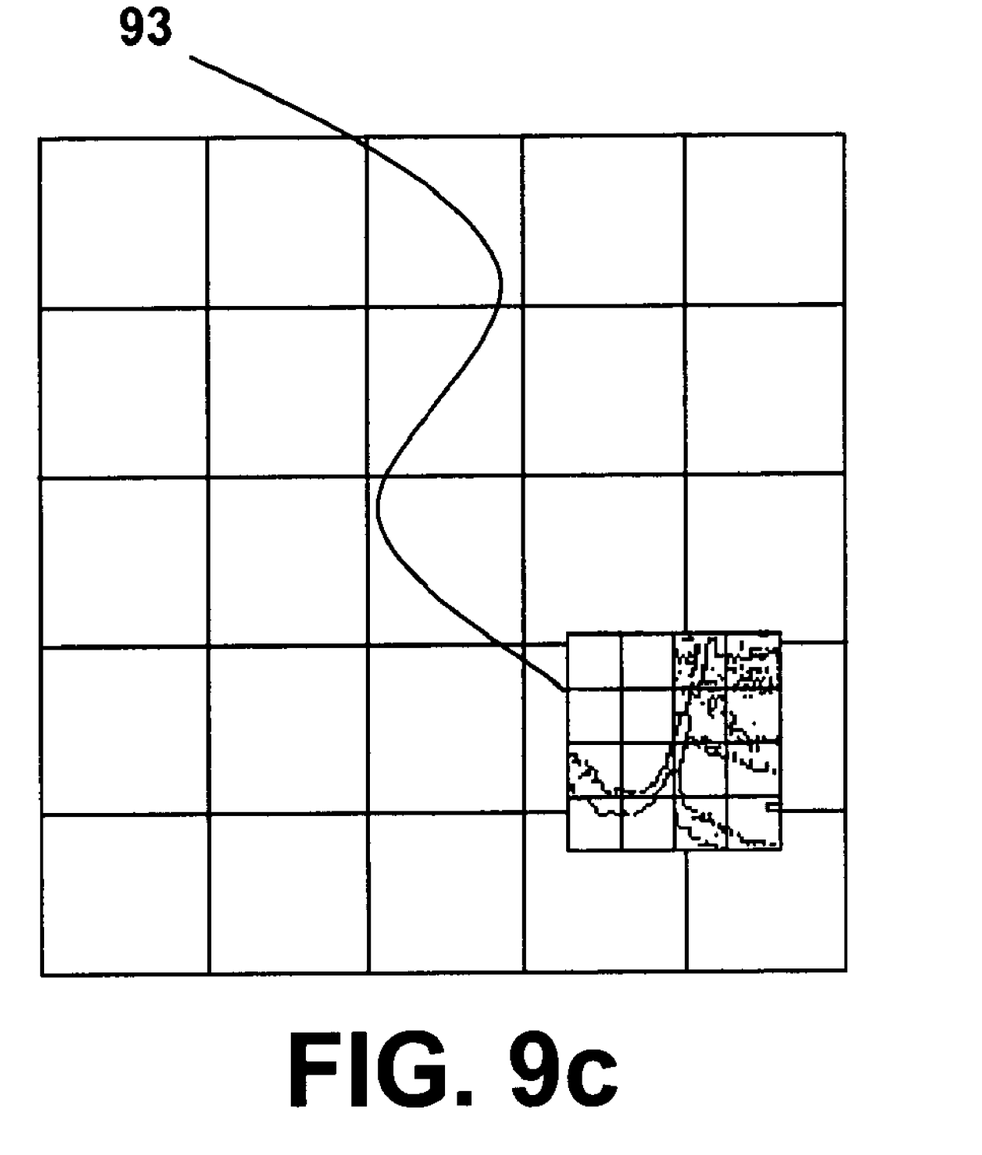

An important application of this family of devices is that of tracking targets based upon their detection through optical means using the VASI and velocity sensing capabilities of this device. FIG. 9 indicates an operational mode in which a detected object (in this case, a missile) is sampled at high spatial resolution by the placement of a foveal region 90 over the object, while the less important background regions of the image are sampled at lower spatial resolution using larger superpixels 91. Well-defined characteristics of the target image (e.g., brightness, shape, motion intensity, etc.) may be used to determine the new location of one or more foveal regions to be applied in the next frame, implemented by re-configuring the spatial connections between neighboring pixels. This figure shows the concept that subsequent frames have placed the foveal region over the target of interest as it moves across the field-of-view, the image for which is located at different coordinates on the imaging array device. This implementation has been reduced to practice, and may be combined with the information provided by the on-chip background velocity sensing capability of the YPR circuits.

Recording the resulting high-speed image data produced by the VASI portion of this device provides data in a general form including a single frame synchronization pulse at the beginning of each frame followed by a stream of analog values corresponding to respective superpixel analog values, and optionally, a data valid signal. Without some record of the instantaneous superpixel configuration of the device that was in effect when the data was collected, there would be no means to be able to reconstruct the spatial features of the image because the regular "full raster" nature of the image will have been broken up by the presence of the superpixels. The processor therefore includes a routine with memory for recording the instantaneous spatial configuration (i.e., each pixel's (U, L) bit configuration) by issuing a specific command to the device. Each spatial configuration of the VASI portion of the device changed due the issuance of a processor command, is read back from the chip including the resulting programmed (U, L) bit configuration for recording and later use. This capability also applies to the ability for future embodiments of VASI technology to be able to supply the unique spatial address code for each superpixel that is read out from the imaging portion of the chip. The result of each of these techniques (either the (U, L) bit configuration for each standard pixel, or the unique spatial address for each superpixel) is to provide the capability to document the instantaneous spatial configuration of the programmed VASI such that later application of this information may be used to either reconstruct a spatial representation of the image or to provide an external digital signal processor the information to be able to establish the spatial relationships between the superpixel values read off of the chip.

Three examples of the use of this present invention as described include (a) stabilization of imagery based on measured scene motion, (b) audio-regime sampling of image data, and (c) target tracking based on detection motion of elements within the scene. For case (a), the measured background angle rates are used to control the motion of a VASI foveal region in opposition to the measured background scene motion. This results in a pixel-level stabilization of image data within the compensating fovea. In case (b), a limited number of high-resolution foveal pixels combined with the limited number of larger-sized low-resolution "background" pixels reduces the total number of superpixels in the image such that the effective frame rate is very high, with the potential of being in excess of 19,000 frames/second as previously discussed. Such sampling can be used to collect audio-regime data of modulated image-based energy. Case (c) would permit such high-temporal sampling to be collected on moving targets in which a foveal region would be "tracked" on the moving target of interest, thus guaranteeing high quality temporal data on targets which would otherwise be exceedingly difficult to track using manual means.

Having now described the invention in detail as required by the patent statutes, those skilled in the art will recognize modifications and substitutions to the specific embodiments disclosed herein. Such modifications are within the scope and intent of the present invention as defined in the following claims.

What is claimed is:

1. A method for data transmission from an image array comprising the steps of:

providing an X by Y array of detector elements for pixels;

defining a charge sharing scheme between adjacent pixels in the array;

identifying a predetermined feature;

examining the array elements for presence of the predetermined feature;

defining a pixel set within a fovea associated with one or more elements of the array in which the predetermined feature is present;

implementing the charge sharing scheme based on presence of the predetermined feature for agglomerating elements outside of the fovea to create super-pixels;

sharing charge between adjacent elements pursuant to the scheme with averaging as super-pixels;

reading a data value from each of the foveal pixels and agglomerated super-pixels in the array; and, analyzing the data values for temporal data content.

2. A method as defined in claim 1 wherein implementing the charge sharing scheme comprises the steps of:

determining a first region of first super-pixel sizes adjacent the fovea; and, determining a second region of second super-pixel sizes adjacent the first region.

3. A method as defined in claim 1 wherein the step of analyzing comprises the steps of:

determining a parameter change in the data values; and, redefining the agglomeration scheme based on the parameter change.

4. A method as defined in claim 3 wherein the parameter is brightness and the step of analyzing further comprises the step of redefining the fovea in response to the change in brightness.

5. A method as defined in claim 1 further comprising the steps of:

recording the pixel agglomeration locations; and, recreating pixel configuration data in the agglomerated condition.

6. A method as defined in claim 1 further comprising the steps of:

providing a plurality of additional arrays circumferentially spaced around the X by Y array;

measuring the response of each circumferential array;

modifying the definition of the foveal pixel set in response to the measured responses of the circumferential arrays.

7. An integrated on-chip variable acuity imager array comprising:

a plurality of image elements arranged in an X by Y array, each of the elements including a detector and a charge integration capacitor;

means for connecting the charge integration capacitor of each element to the charge integration capacitor of a left adjacent element responsive to a first control signal;

means for connecting the charge integration capacitor of each element to the charge integration capacitor of an upper adjacent element responsive to a second control signal;

means for selectively generating the first control signal for each element in a dynamically defined super-pixel;

means for selectively generating the second control signal for each element in the dynamically defined super-pixel;

means for dynamically defining at least one super-pixel;

means for reading the charge integration capacitor of each element not receiving a control signal and for reading the charge integration capacitor of a master element in each super-pixel, the master element being the leftmost and uppermost element in the super pixel.

8. An integrated on-chip variable acuity imager array as defined in claim 7 wherein the means for selectively generating the first and second control signals comprise unit cell static RAMs and the means for dynamically defining the at least one super-pixel comprises:

means for identifying a predetermined feature;

means for defining a foveal pixel set of elements responsive to the identifying means;

means for defining at least one super-pixel of elements outside the foveal pixel set;

means for storing an indicator for the first control signal in the associated RAM for each element in the super-pixel which is not leftmost; and means for storing an indicator for the second control signal in the associated RAM for each element in the super-pixel which is not uppermost.

9. An integrated on-chip variable acuity imager array as defined in claim 8 further comprising:

a plurality of motion sensing arrays circumferentially spaced around the X by Y array, each motion sensing array having a plurality of elements substantially tangentially oriented to the X by Y array;

an edge detector associated with each element, each edge detector connected to adjacent edge detectors for elements of the motion sensing array;

means for synchronizing a signal received connected to each edge detector, the synchronizing means connected for transmission of the signal;

means for computing velocity associated with each edge detector based on the signal received from the synchronizing means for the associated edge detector and the synchronizing means for each adjacent edge detector;

means for connecting the velocity computing means for spatial integration of the computed velocities to provide a velocity vector; and, wherein the means for defining the foveal pixel set is responsive to the velocity vector.

10. An integrated on-chip variable acuity imager array as defined in claim 9 wherein the plurality of motion arrays comprises 12 motion arrays spaced at substantially equal angles around the circumference of the X by Y array.

11. An integrated on-chip variable acuity imager array as defined in claim 8 further comprising means for storing the RAM contents for the elements of the array in conjunction with storage of an output for each element from the sample and hold reading means.

* * * * *